US011224295B2

(12) United States Patent
Werner

(10) Patent No.: US 11,224,295 B2
(45) Date of Patent: Jan. 18, 2022

(54) SMART ADJUSTABLE BED SYSTEM

(71) Applicant: Werner Media Partners, LLC, Plantation, FL (US)

(72) Inventor: Marc L. Werner, Plantation, FL (US)

(73) Assignee: Werner Media Partners, LLC, Plantation, FL (US)

( * ) Notice: Subject to any disclaimer, the term of this patent is extended or adjusted under 35 U.S.C. 154(b) by 0 days.

(21) Appl. No.: 15/986,806

(22) Filed: May 22, 2018

(65) Prior Publication Data

US 2019/0116986 A1 Apr. 25, 2019

Related U.S. Application Data

(60) Provisional application No. 62/509,709, filed on May 22, 2017.

(51) Int. Cl.
| | | |
|---|---|---|
| A47C 20/04 | (2006.01) | |
| A47C 19/12 | (2006.01) | |
| A47C 20/08 | (2006.01) | |
| A61G 7/018 | (2006.01) | |
| A61G 7/015 | (2006.01) | |
| A47C 21/00 | (2006.01) | |
| A47C 31/00 | (2006.01) | |
| G05B 15/02 | (2006.01) | |

(52) U.S. Cl.
CPC ............ *A47C 20/041* (2013.01); *A47C 19/12* (2013.01); *A47C 20/08* (2013.01); *A61G 7/015* (2013.01); *A61G 7/018* (2013.01); *A47C 21/003* (2013.01); *A47C 31/008* (2013.01); *A61G 2203/42* (2013.01); *G05B 15/02* (2013.01)

(58) Field of Classification Search
CPC ... A47C 20/041; A47C 1/03211; A47C 19/12; A47C 31/008; A61G 7/015; G05B 15/00
See application file for complete search history.

(56) References Cited

U.S. PATENT DOCUMENTS

| | | | |
|---|---|---|---|
| 8,019,486 | B2 | 9/2011 | Rawls-Meehan |
| 2011/0211584 | A1* | 9/2011 | Mahmoud ........... H04L 12/2838 370/401 |
| 2012/0057685 | A1 | 3/2012 | Rawls-Meehan |
| 2012/0119887 | A1 | 5/2012 | Rawls-Meehan |
| 2012/0138067 | A1 | 6/2012 | Rawls-Meehan |
| 2014/0188285 | A1 | 7/2014 | Rawls-Meehan |
| 2015/0238023 | A1* | 8/2015 | Rawls-Meehan .... A47C 20/041 700/275 |
| 2018/0114591 | A1* | 4/2018 | Pribanic ................. G16H 40/67 |
| 2019/0104860 | A1* | 4/2019 | Blumberg ............ A47C 27/062 |

* cited by examiner

*Primary Examiner* — Said Bouziane
(74) *Attorney, Agent, or Firm* — Pearson IP; Loren Donald Pearson

(57) ABSTRACT

A smart adjustable bed system combines an adjustable bed, a smart hub, a server, and smart devices to provide a system for controlling the raising and lowering of the adjustable bed. The smart hub acts as a gateway interconnecting the smart adjustable bed and a remote server capable of powerful voice recognition and artificial intelligence at a shared price. The system includes methods of using the system to allow an additional smart device such as a tablet computer to act as a remote control for the smart adjustable bed. The system further enables voice controls to be used to raise and lower the adjustable bed. Lastly, the voice recognition of the smart hub can be used to detect snoring and to send a signal to the adjustable bed to raise the bed to a position until the user reaches a position where snoring stops.

16 Claims, 4 Drawing Sheets

SMART ADJUSTABLE BED SYSTEM

CROSS-REFERENCE TO RELATED APPLICATIONS

This application claims the benefit of U.S. Provisional Application No. 62/509,709, filed May 22, 2017, which is hereby incorporated by reference.

STATEMENT REGARDING FEDERALLY SPONSORED RESEARCH OR DEVELOPMENT

Not Applicable

THE NAMES OF PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

The invention relates to adjustable beds and voice activated smart devices.

Description of the Related Art

Adjustable beds are beds with section that are raised and lowered by motors to change the sleeping position of users.

A wired remote can be connected to the motor. The wired remote is used to signal the motors to raise or lower sections of the bed.

Adjustable beds can include a computer that can control the motors of the adjustable bed to provide preset positions to the user.

An adjustable bed with a wired remote exits that allows a first user to adjust the sleeping position of a second user so that the first user can stop the second user from snoring.

BRIEF SUMMARY OF THE INVENTION

An object of the invention is to provide a smart adjustable bed that overcomes the disadvantages of the devices and methods of this general type and of the prior art.

With the foregoing and other objects in view there is provided, in accordance with the invention, a smart adjustable bed. The smart adjustable bed includes a motor for raising and lowering a mattress on the bed. The motor is connected to a computer that receives signals and controls the motor. The computer is connected to a receiver that can receive messages from a device cloud to raise or lower the bed.

With the foregoing and other objects in view there is provided, in accordance with the invention, a smart motion furniture. Motion furniture includes sofas, chairs, and recliners. The smart adjustable furniture includes a motor for reconfiguring the furniture and/or moving a person using the furniture. The motor is connected to a computer that receives signals and controls the motor. The computer is connected to a receiver that can receive messages from a device cloud to move the motion furniture.

The invention includes a smart hub such as those sold under the trade names ALEXA, ECHO, GOOGLE HOME, and SMARTTHINGS. The smart hub is a gateway or home controller. The smart hub allows users to control, automate, and monitor their home environment via voice, signal, or mobile device. The smart hub can be configured to fit each user's needs.

The smart hub can connects to a home's internet router and can be compatible with communication protocols such as ZigBee, Z-Wave, and IP-accessible devices. The smart hub serves to connect sensors and devices to one another and to the cloud.

The smart hub can interact with cloud-based voice interaction systems. The smart hub can control other the smart adjustable bed by using voice commands.

The smart hub can be configured to listen for snoring and then send a signal to raise a sleeper's bed, which in turn prevents snoring. The listening function can be initiated by giving the smart hub a voice command.

Other features that are considered as characteristic for the invention are set forth in the appended claims.

Although the invention is illustrated and described herein as embodied in a smart adjustable bed system, the invention should not be limited to the details shown in those embodiments because various modifications and structural changes may be made without departing from the spirit of the invention while remaining within the scope and range of equivalents of the claims.

The construction and method of operation of the invention and additional objects and advantages of the invention is best understood from the following description of specific embodiments when read in connection with the accompanying drawings.

DETAILED DESCRIPTION OF THE INVENTION

Figure 1:
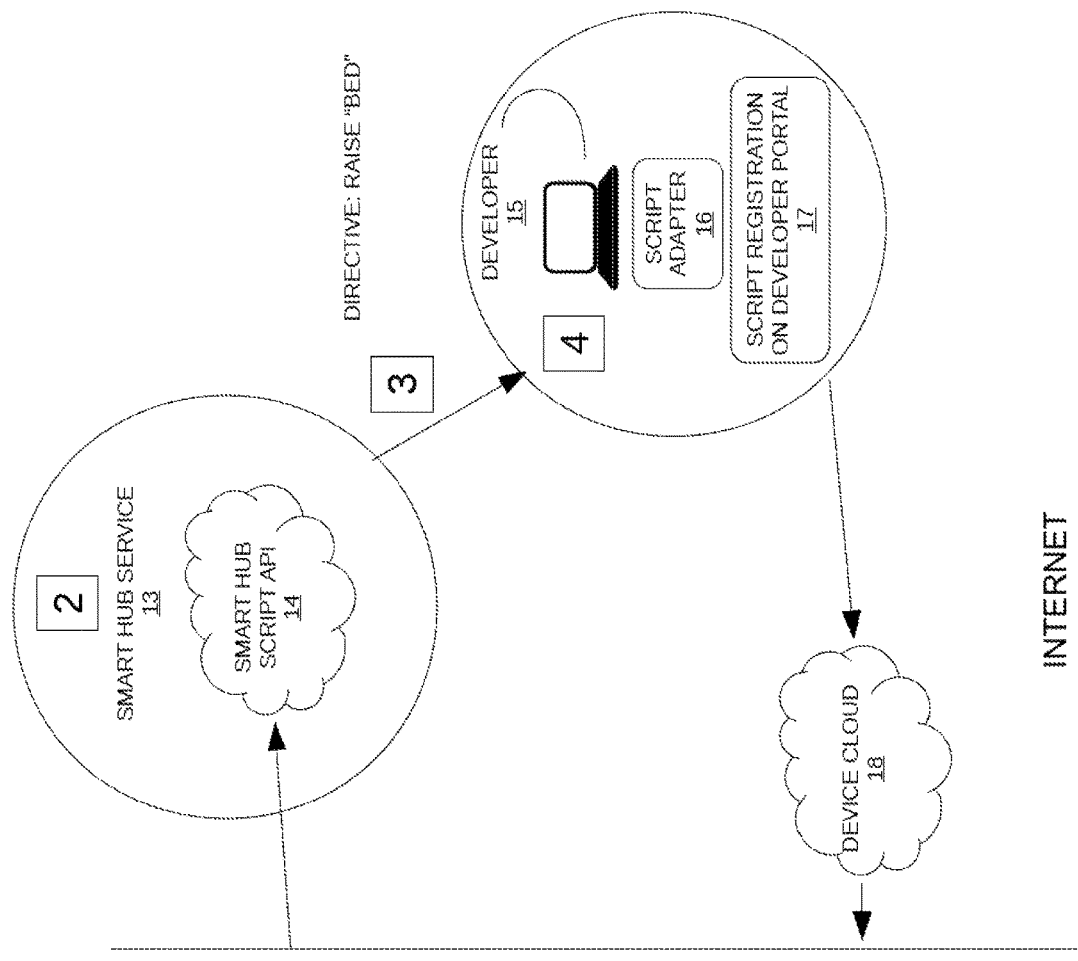
FIG. 1 is a schematic of an adjustable bed smart device according to the invention.
Figure 1:
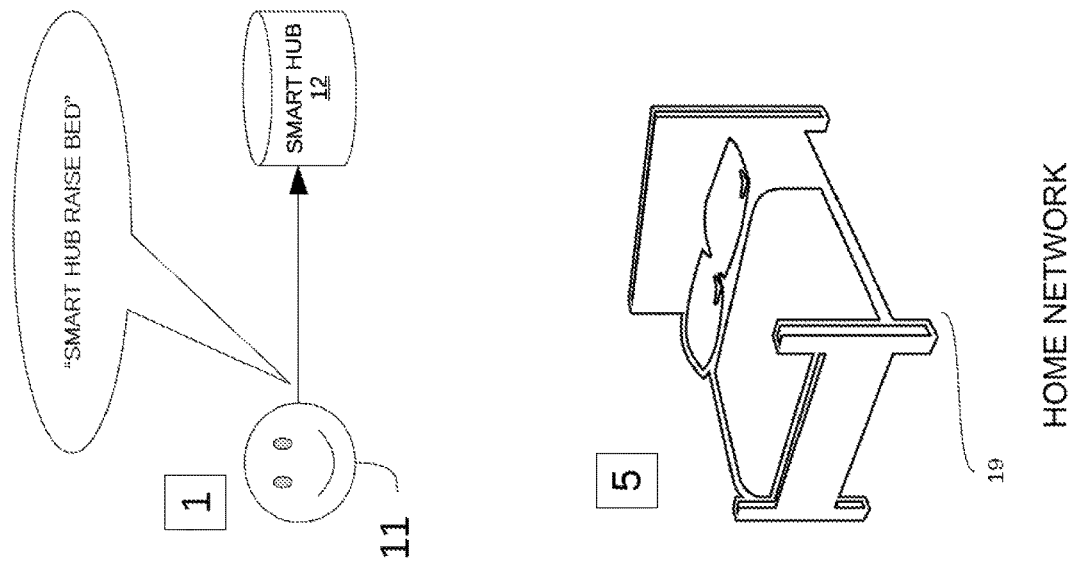

The following describes the parts of a smart adjustable-bed system and a method for using the adjustable bed smart device to raise and lower a bed.

A customer 11 is the person interacting with a smart hub 12 and the owner of the cloud-enabled smart adjustable bed 19. The customer 11 issues voice commands that are recorded by a microphone in the smart hub 12.

The smart adjustable-bed system includes the following parts.

The smart hub API 14 is a cloud-hosted computer service that understands the voice commands recorded by and received from the smart hub 12 and converts the voice commands to directives (JSON messages) that are sent to smart home script API 14.

A hosted script adapter 16 receives directives from the smart home script API 14. The script adapter 16 is a cloud-based compute service that hosts the smart home script code.

A smart home script is code and configuration that interpret directives and sends messages to a device cloud 18.

A device cloud 18 is the cloud environment provided by the bed manufacturer that controls and manages the customer's cloud-enabled smart adjustable bed.

The following example demonstrates how a customer 11 raises his or her adjustable smart bed 30.

In step 1, the customer 11 who has previously added the bed 19 to the customer's device cloud 18 says, "Smart hub, raise bed" to the customer's smart hub 12.

In step 2, the smart hub 12 hears this instruction and sends the instruction to the smart hub service 13 for interpretation.

In step 3, the smart hub script API 14 interprets the action as "raise" and the device name as "bed". The smart hub script API 14 composes a message to send to the script adapter 14 that controls the bed 19. This message is called a directive.

The directive includes: the action (raise), the device identifier (an ID representing the bed 19 that the customer named "bed"), and information authenticating the customer 11.

In step 4, the script adapter 16 receives and parses the request for the action, the device identifier, and authentication details. The script adapter 16 uses this information to communicate with the device cloud 18. The script adapter 16 generates a message to the customer's device cloud 18, and tells the adjustable bed 19 to raise.

In step 5, the device cloud 18 gets the message and the smart adjustable bed 19 raises.

In a step that is not shown, the script adapter 16 sends a response back to the smart home script API 14 indicating whether the script adapter 16 successfully raised the smart adjustable bed 19. The smart hub 12 uses this response to determine the appropriate response to the customer 11. For example, the smart hub 12 might say, "OK" to indicate the requested action is complete.

A Developer 15 is a writer of a smart home script. The developer 15 follows protocols set by the smart hub service 13. The smart hub service 13 knows how to interpret the customer's speech and generate messages to send to smart home scripts.

Generally, smart home script development falls into two categories. First, Developers 15 who represent the smart adjustable bed 19 manufacturer that want to enable customers 11 to interact with the smart adjustable bed 19 using the voice of the customer. Second, developers 15 who want to create a script for the smart adjustable bed, either for their own private use or general public use. Certification is required for public use.

In a second preferred embodiment, the customer 11 who has previously added the bed 19 to the customer's device cloud 18 says, "Smart hub, stop snoring" to the customer's smart hub 12.

In step 2, the smart hub 12 hears this instruction and sends the instruction to the smart hub service 13 for interpretation.

In step 3, first, the smart hub script API 14 interprets the action as "listen for snoring" and the device name as "smart hub" The smart hub script API 14 composes a message to send to the script adapter 14 that controls the smart hub 12. This message is called a directive. The directive includes: the action (listen for snoring), the device identifier (an ID representing the smart hub 12 to which the customer 11 gave the instruction), and information authenticating the customer 11. Next, if the smart hub 12 hears snoring, the smart hub script API 14 composes a message to send to the script adapter 14 that controls the smart adjustable bed 19. This directives includes: the action (raise), the device identifier (an ID representing the smart adjustable bed 19 that is to raise).

In step 4, the script adapter 16 receives and parses the request for the action, the device identifier, and authentication details. The script adapter 16 uses this information to communicate with the device cloud 18. The script adapter 16 generates a message to the customer's device cloud 18, and tells the adjustable bed 19 to raise.

In step 5, the device cloud 18 gets the message and the smart adjustable bed 19 raises.

In an embodiment that is not shown, a smart device such as a tablet or smart phone can be used send instructions to raise or lower the smart adjustable bed to the smart hub 12. In addition, the microphone in the smart phone or tablet can be used to detect when the customer 11 is snoring.

Figure 2:
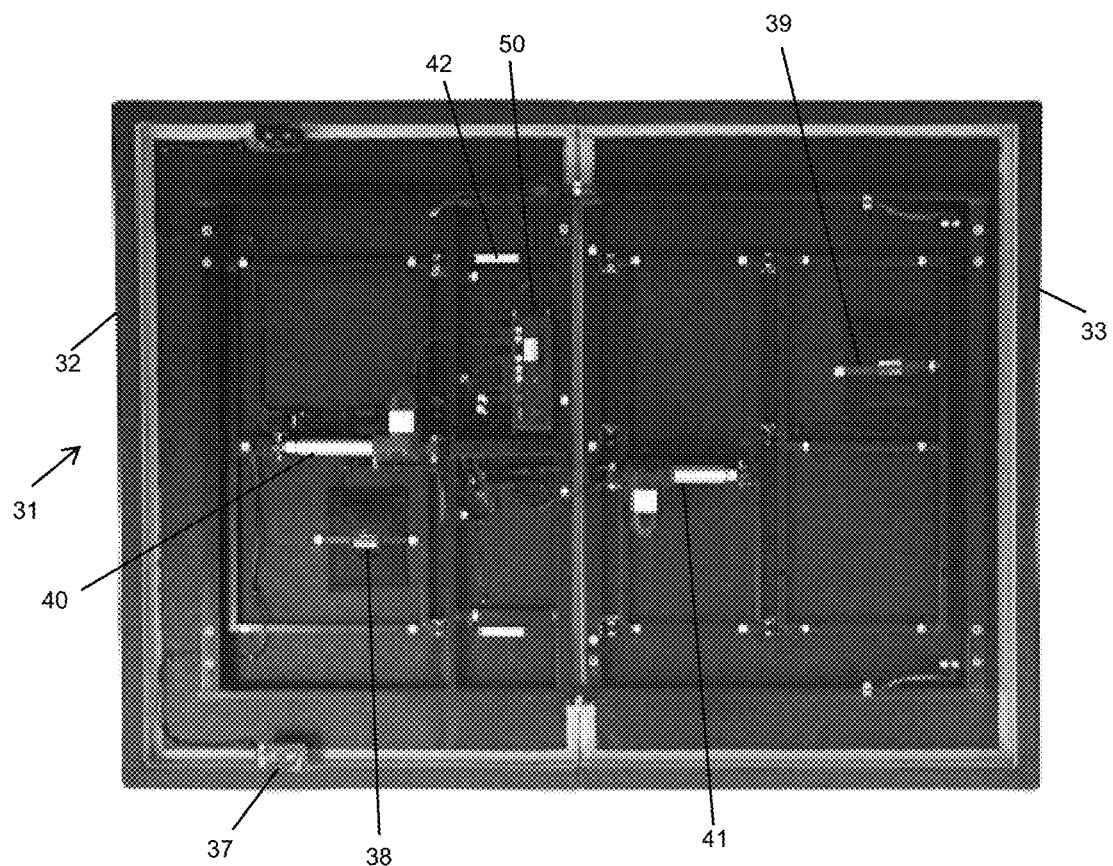
FIG. 2 is a bottom view of smart adjustable bed according to the invention.
Figure 3:
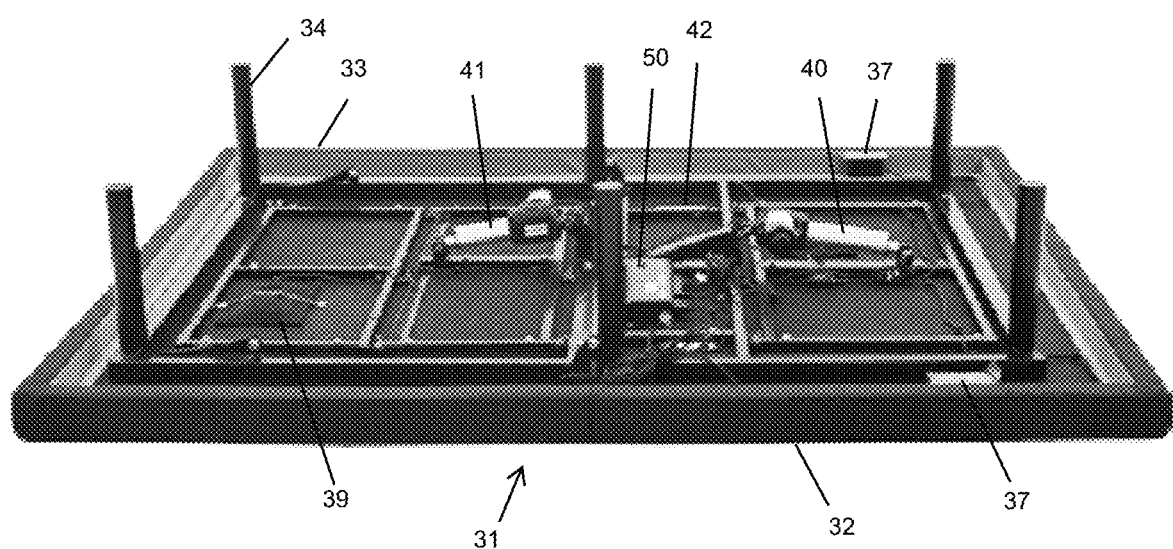
FIG. 3 is a bottom perspective view of the smart adjustable bed shown in FIG. 2.
Figure 4:
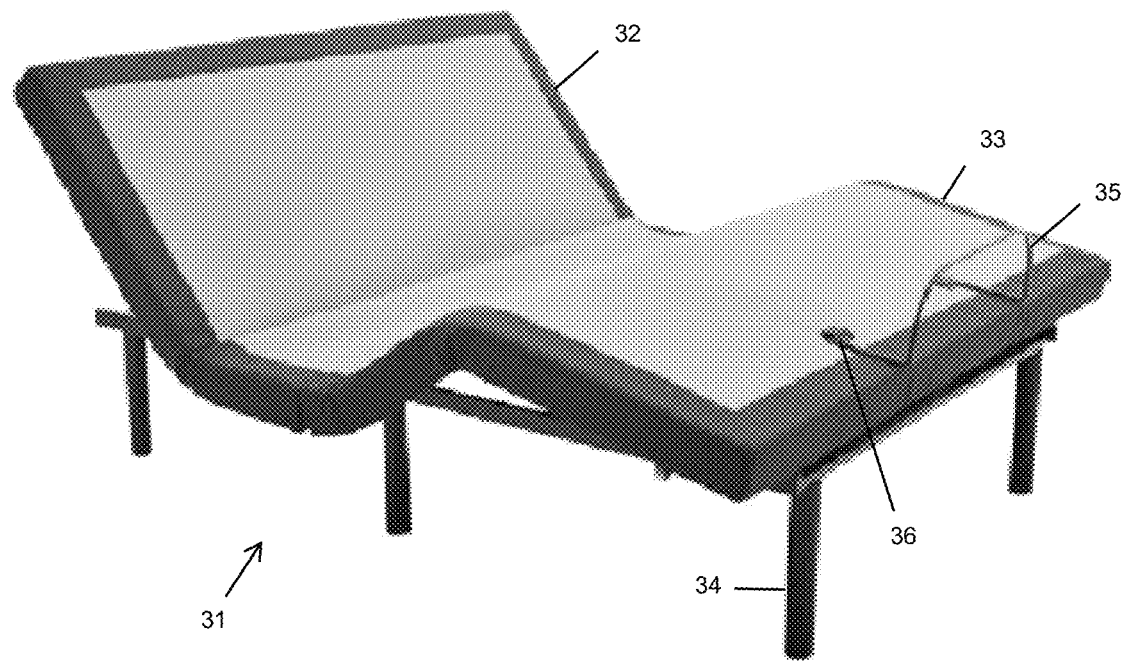
FIG. 4 is a top perspective view of the smart adjustable bed shown in FIG. 2.

FIGS. 2-4 show a preferred embodiment of a smart adjustable bed. The smart adjustable bed includes a bedframe 31. The bedframe 31 is divided into a head frame piece 32 and a foot frame piece 33. Six legs 34 are connected to the bedframe 31. The head frame piece 32 moves relative to the foot head piece 33 to move the smart adjustable bed from a flat position as shown in FIG. 3 to an inclined position as shown in FIG. 4.

FIGS. 2-3 show the bottom of the bedframe 31. A controller 50 is disposed on the bottom of the bedframe 31. The controller 50 is connected to a head motor 40. The controller 50 sends an incline signal to the head motor 40 to activate the head motor 40. The head motor 40 raises the head frame piece 32 from the flat position to the inclined position. The controller 50 sends a decline signal to the head motor 40 to activate the head motor 40. The head motor 40 lowers the head frame piece 32 after receiving the decline signal. The head motor 40 can be stopped at any time to control the amount of inclination. A sensor connected to the controller 50 detects an amount of inclination of the head frame piece 32.

The controller 50 is connected to a foot motor 41. The controller 50 sends an incline signal to the foot motor 41 to activate the foot motor 41. The foot motor 41 raises the food frame piece 33 from the flat position to the inclined position. The controller 50 sends a decline signal to the foot motor 41 to activate the foot motor 41. The foot motor 41 lowers the foot frame piece 33 after receiving the decline signal. The foot motor 41 can be stopped at any time to control the amount of inclination. A sensor connected to the controller 50 detects an amount of inclination of the foot frame piece 33.

Devices such a USB port 37, head massage motor 38, foot massage motor 39, and LED lights are connected to the controller 50. The controller 50 sends signals to activate and deactivate the devices.

FIG. 4 shows retainer bar 35. The retainer bar 35 prevents a mattress (not shown) from slipping from the bedframe 31, particularly when the bedframe is in an inclined position as shown in FIG. 4. The retainer bar 35 connects to the bedframe 31 with quick connect brackets 36.

Figure 5:
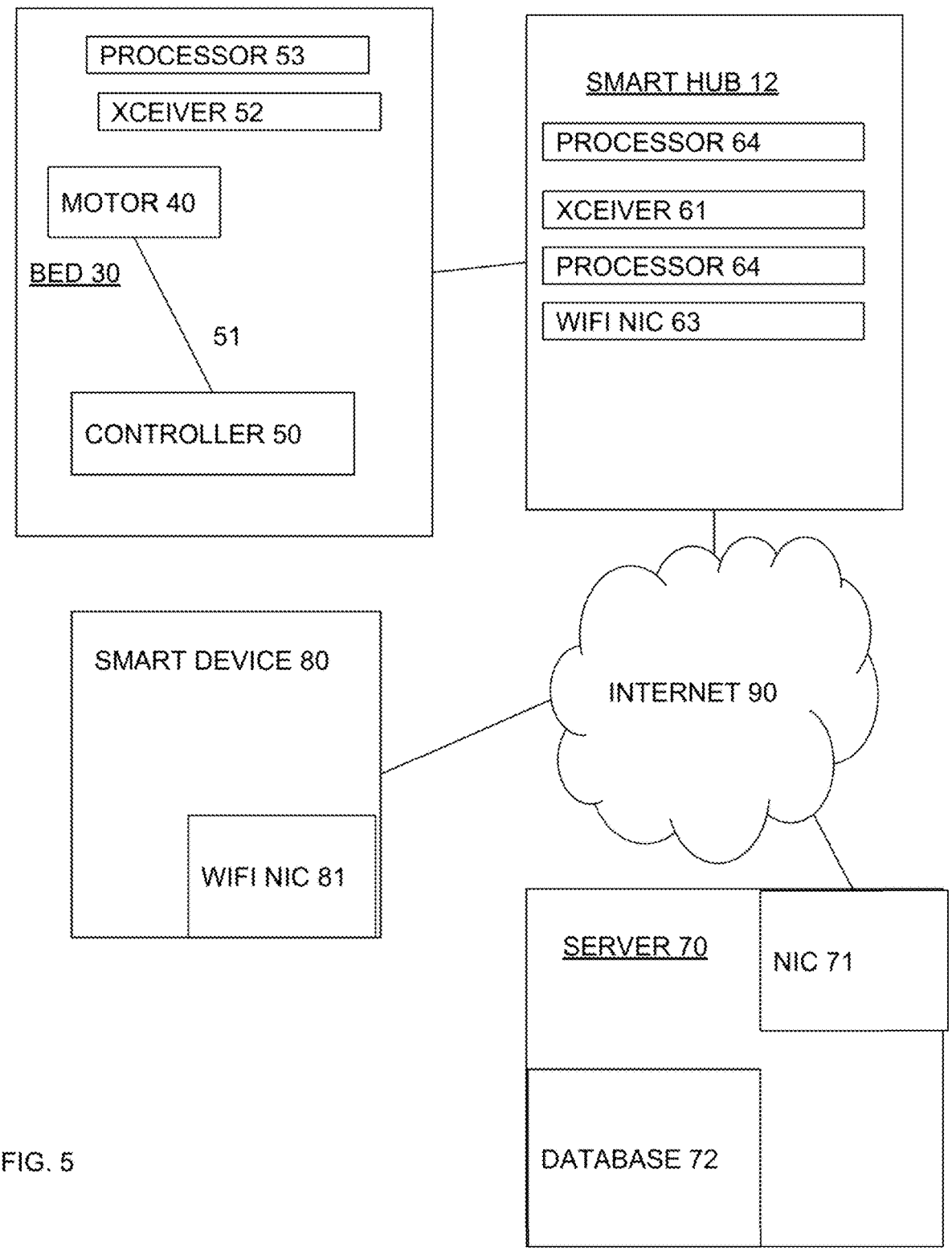
FIG. 5 is a schematic view of the smart adjustable bed system.

FIG. 5 shows a preferred embodiment of smart adjustable bed system. The smart adjustable bed system includes a smart adjustable bed 30, a smart hub 12, a server 70, and a smart device 80.

The smart adjustable bed 30 includes a smart adjustable bedframe 31 as previously described with a mattress disposed on the top of the bedframe 31. The bedframe 31 includes a motor 40. When the motor can be operated in two directions: the first to cause the bed to incline and the second to cause the bed to decline. A bus 51 interconnects the motor 40 and the controller 50. The controller 50 sends a incline signal on the bus 51 to the motor causing the motor to incline the bedframe piece 32. The controller sends a decline signal on the bus 51 to the motor causing the motor to decline the bedframe piece 32. The incline signal and decline signal are each preferably binary (i.e. on/off signals). The motor 40 includes a sensor that sends data describing the position of the bedframe (i.e. flat, inclined, 50% inclined) to the controller 50 via the bus 51.

The controller 50 includes a wireless transceiver 52 and a controller microprocessor 53. The controller transceiver sends and receives computer-readable instructions that comply with a device API. An example of a preferred embodiment of a device API is sold under the trade name SMARTTHINGS. The controller transceiver 52 communicates via wireless protocol as ZigBee, Z-Wave, and IP. The controller microprocessor 53 is connected to the controller transceiver 52. The controller microprocessor 53 receives computer-readable instructions that comply with a device protocol and converts them into the signals that control the motors 40/41.

The controller microprocessor 53 can generate computer-readable messages that comply with the device protocol that describe the status of the parts of the smart adjustable bed. Particularly, the controller microprocessor 53 is programmed to process signals describing the position of the adjustable bed into computer-readable messages. The controller transceiver 52 transmits the computer-readable message to the smart hub via the wireless device network.

The preferred embodiment of the smart adjustable bed system includes a smart hub 12. Preferred embodiments of smart hubs are sold under the trademarks AMAZON ECHO and GOOGLE HOME. The smart hub 12 includes a device transceiver 61 and a server transceiver 63. A preferred embodiment of the device transceiver is radio frequency transmitter. Preferred embodiments of the server transceiver include wired NICs and wireless NICs. The device transceiver 61 transmits and receives computer-readable instructions according to a device API to and from the controller transceiver 52. The server transceiver transmits computer-readable instructions according to a server API. The smart hub 12 includes a smart hub microprocessor 62, which acts as a network gateway interconnecting the device transceiver 61 and the server transceiver 62. The smart hub microprocessor 62 converts computer-readable instructions and messages to and from the device API and the server API.

Preferably, the smart hub includes a microphone 64 connected to the smart hub microprocessor 62. The microphone is placed within listening range of the smart adjustable bed. The microphone 64 is configured to send recorded sounds to the smart hub microprocessor 62. The smart hub microprocessor 62 converts the recorded sounds to recorded sounds compliant with the server API and transmits the recorded sounds compliant with the server API from the server transceiver 63 to a server 70. Typically, the server 70 is located remotely from the smart adjustable bed 30 and smart hub 12.

The smart adjustable bed system preferably includes a computer server 70. The computer server 70 includes a NIC 71 to connect it to the server network. The preferred embodiment of the server network is an IP network such as the Internet 90. The server 70 is programmed to process computer-readable instructions complying with the server API and to send computer-readable instructions complying with the server API to the smart hub 12.

Preferably, the server 70 is connected to a computerized database 72. The database stores data identifying the smart adjustable bed 30, the smart hub 12, and the instructions and messages being sent to and from them, and relates them to each other.

The server 70 can be used to perform voice recognition on voice instructions recorded by the microphone 64 of the smart hub 12. Likewise, the server can be used to detect snoring in the sounds recorded by the smart hub 12. In turn, the server 70 generates computer-readable instructions and messages that comply to the server API and transmit them to connected devices such as the smart hub 12.

The system preferably includes a smart device 80 which can act as an input/output display for the system. Preferred embodiments of smart devices include smartphones, tablet computer, personal computers, and smartwatches. The smart device 80 has a wireless NIC 81 to connect the smart device 80 to the server 70 preferably by the internet 90 using wifi or a wireless telephone network. 8. The smart device 80 can display status information on the position (amount of incline) of the smart adjustable bed that is being relayed from the smart adjustable bed 30 to smart hub 12 to the server 70 and then to the smart device 80. In addition, the smart device 80 is preferably a remote control for the smart adjustable bed 30 and can signals via the server 70 through the smart hub 12 to the smart adjustable bed 30 that instruct the bed 30 to raise or lower.

A preferred method of inclining an adjustable bed utilizes the features of the smart adjustable bed system to use a smart device 80 to adjust the inclination of the smart adjustable bed 30. The first involves transmitting a computer-readable instruction to incline the adjustable bed from a smart device 80 to a server 70. The computer-readable instruction from said smart device complying with a server API. The next step involves transmitting a computer-readable instruction from the server 70 to a smart hub 12 across a server network. The preferred embodiment of the server network is the Internet. The computer-readable instruction being transmitted from the server complies with the server API. The next step is converting the computer-readable instruction from said server to a computer-readable instruction that is compliant with a device API. The next step is transmitting the computer-readable instruction compliant with the device API to a controller of the adjustable bed. The next step is transmitting a signal from the controller to a motor of the adjustable bed. The next step is activating the motor after receiving the signal from the control until the smart bed is in an inclined position.

The method can include steps that confirm the position of the smart adjustable bed after the motor was activated. The first step is, after transmitting the signal to the motor, transmitting a computer-readable message compliant with the device API to the smart hub over the device network. The computer-readable message includes information that indicates the position (i.e. amount of incline) of the adjustable bed. The next step is converting the computer-readable message compliant with the device API to a computer-readable message compliant with the server API with said smart hub. The smart hub microprocessor 62 performs the conversion. The next step is transmitting the computer-readable message compliant with the server API from the smart hub to the server over the server network. The next step is transmitting the computer-readable message compliant with the server API from the server 70 to the smart device 80. The final step is indicating the adjustable bed is in the inclined position on the smart device 80 after receiving the computer-readable message compliant with the server API from the server 70. This position can be indicated with a pictogram of the smart adjustable bed being displayed on a screen of the smart device 80.

Another preferred method of using the smart adjustable bed system is to use voice commands to control the inclination of the adjustable bed. The first step of the method is saying a voice command to incline the adjustable bed (e.g. "raise the bed") within hearing distance of a microphone 64 in a smart hub 12. The next step is sending the voice command from the microphone 64 to the smart hub microprocessor 62. The next step is generating with the smart hub microprocessor 62 recorded sounds compliant with a server API from the voice commands received from the microphone 64. The next step is transmitting the recorded sounds compliant with the server API from said smart hub 12 to a server 70, which is connected by the Internet. The next step is generating with the server 70 a computer-readable instruction compliant with the server API from the recorded sound compliant with the server API received from the smart hub 12. The computer-readable instruction will instruct the smart bed 30 to move to an inclined position. The next step is transmitting the computer-readable instruction compliant with the server API from the server 70 to the smart hub 12 across the Internet. The next step is converting with the smart hub microprocessor 62 the computer-readable instruction compliant with the server API to a computer-readable instruction compliant with a device API. The next step is transmitting the computer-readable instruction compliant with the device API from the smart hub 12 to a controller 50 across the device network via a wireless, ZIGBEE, Z-WAVE or the like. The next step is generating with the controller 50 a signal to activate a motor 31 of the adjustable bed 30. The next step is transmitting the signal from the controller 50 to the motor 31. The last step is activating the motor after receiving the signal from the controller 50 until the adjustable bed 30 reaches an inclined position.

A third preferred method of using the smart adjustable bed system provides a way to stop snoring. The first step is positioning a microphone 64 of a smart hub 12 within hearing distance of an adjustable bed 30. The next step is transmitting sound detected by the microphone to a microprocessor 62 in the smart hub 12. The next step is generating with the microprocessor 62 recorded sounds compliant with a server API from the sound received from the microphone 64. The next step is transmitting the recorded sounds compliant with the server API from the smart hub 12 to a remote server 70 on the Internet 90. The next step is detecting with the server 70 snoring in the recorded sounds compliant with the server API. The next step is generating with the server 70 a computer-readable instruction compliant with the server API after detecting the snoring in the recorded sound compliant with the server API. The computer-readable instruction will instruct the smart bed 30 to move to an inclined position. The next step is transmitting the computer-readable instruction compliant with the server API from the server 70 to the smart hub 12 via the Internet 90. The next step is converting with the microprocessor 62 of the smart hub 64 the computer-readable instruction compliant with the server API to a computer-readable instruction compliant with a device API. The next step is transmitting said computer-readable instruction compliant with the device API from the smart hub 12 to a controller 50 via the device network. The next step is generating with the controller 50 a signal to activate a motor 40 of the adjustable bed 30. The next step is transmitting the signal from said controller 50 to the motor 40, preferably via a bus 51. The next step is activating the motor 40 after receiving the signal from the controller 50 until the adjustable bed 30 reaches an inclined position.

What is claimed is:

1. A smart adjustable bed system, comprising:
   a smart adjustable bed, including:
      a bedframe having a head frame piece and a foot frame piece, said head frame piece being movable relative to said foot frame piece to move said bedframe from a flat position to an inclined position;
      a motor for inclining and declining said bedframe, said motor being connected to at least one of said head frame piece and said foot frame piece, and said motor moving said at least one of said head frame piece and said foot frame piece to move the bedframe from the flat position to the inclined position when activated, said motor including a sensor for detecting a position of said bedframe;
      a bus for carrying signals to said motor, said bus being connected to said motor;
      a controller for converting computer-readable instructions to signals for controlling said motor, said controller being connected to said bus, said controller having a controller transceiver and a microprocessor connected to said controller transceiver, said controller transceiver being configured to receive a computer-readable instruction, the computer-readable instruction being an instruction to move said bedframe from the flat position to the inclined position, said controller transceiver being further configured to send the computer-readable instruction to said microprocessor, said microprocessor being programmed to generate a signal to activate said motor after processing the computer-readable instruction, said microprocessor sending said signal to said motor via said bus, said controller transceiver transmitting a computer-readable message, the computer-readable message confirming said head frame piece and said foot frame piece are in the inclined position, said controller receiving a signal describing the position of said bedframe from said sensor via said bus, said microprocessor converting the signal describing the position of said bedframe into computer-readable messages, said controller transmitting the computer-readable message; and
   a smart hub including:
      a device transceiver being configured to send the computer-readable instruction over a device network to said controller transceiver and receive the computer-readable message over the device network from said controller transceiver, the computer-readable instructions describing the position of the bedframe;
      a server transceiver sending data over a server network to a server, said server transceiver receiving data over the server network from the server;
      a network gateway interconnecting said device transceiver and said server transceiver; said network gateway including a microprocessor, said microprocessor being programmed to convert a computer-readable message complying with a server API to a computer-readable message complying with a device API and to convert a computer-readable message complying with the device API to a computer-readable message complying with the server API; and a microphone being connected to said microprocessor, said microphone being within listening range of said smart adjustable bed;

said microphone being configured to send recorded sounds originating near the smart adjustable bed to said microprocessor; and said microprocessor analyzing the recorded sounds for snoring and transmitting a signal to incline said smart adjustable bed from said server transceiver to a server after detecting the snoring in the recorded sounds, the signal being compliant with the server API.

2. The smart adjustable bed system according to claim 1, wherein said controller transceiver is a wireless radio transceiver, said wireless radio transceiver being configured to receive the computer-readable instruction via a radio-frequency transmission from the smart hub and being further configured to transmit the computer-readable message to the smart hub via a radio-frequency transmission from the controller transceiver.

3. The smart adjustable bed system according to claim 1, further comprising said server, said server being connected to said server network, said server being configured to process computer-readable instructions complying with the server API and to send computer-readable instructions complying with the server API to said smart hub.

4. The smart adjustable bed according to claim 3, further comprising a database connected to said server, said database relating computer-readable instructions received by said server to an identity of said smart hub and to an identity of said smart adjustable bed.

5. The smart adjustable bed system according to claim 3, further comprising a smart device, said smart device being connected to said server, said smart device being configured to send a computer-readable instruction to activate said motor to said server, said server sending a computer-readable instruction to activate said motor to said smart hub after receiving the computer-readable instruction from the smart device.

6. The smart adjustable bed system according to claim 5, wherein said smart device is configured to covert said computer-readable instructions confirming said head frame piece and said foot frame piece are in the inclined position to computer-readable instructions compliant with the server API to said server.

7. The smart adjustable bed system according to claim 6, further comprising a smart device, said smart device being connected to said server and being configured to receive computer-readable instructions confirming said head frame piece and said foot frame piece are in the inclined position sent by said server, said smart device including an indicator, said smart device activating said indicator to indicate said head frame piece and said foot frame piece are in the inclined position after receiving the computer-readable instruction from the server.

8. A method for inclining an adjustable bed, which comprises:

detecting snoring with a smart hub;

after detecting the snoring, transmitting a computer-readable instruction to incline the adjustable bed from said smart hub to a server, the computer-readable instruction from said smart hub complying with a server API and describing a position of the adjustable bed;

transmitting a computer-readable instruction from said server to said smart hub across a server network, said computer-readable instruction from said server complying with the server API;

converting the computer-readable instruction from said server to a computer-readable instruction compliant with a device API;

transmitting said computer-readable instruction compliant with the device API to a controller of the adjustable bed;

transmitting a signal from said controller to a motor of the adjustable bed; and activating said motor after receiving the signal from the controller until the adjustable bed is in an inclined position;

transmitting a computer-readable signal describing a position of the adjustable bed to said smart hub; and transmitting a computer-readable signal describing a position of the adjustable bed from said smart hub to a further device.

9. The method according to claim 8, which further comprises:

after transmitting the signal to said motor, transmitting a computer-readable message compliant with the device API to said smart hub over a device network, the computer-readable message indicating the adjustable bed is in the inclined position, the device network interconnecting said controller and said smart hub;

converting the computer-readable message compliant with the device API to a computer-readable message compliant with the server API with said smart hub;

transmitting the computer-readable message compliant with the server API from said smart hub to said server over the server network;

transmitting the computer-readable message compliant with the server API from said server to said smart hub; and indicating said adjustable bed is in the inclined position on said smart hub after receiving the computer-readable message compliant with the server API from the server.

10. The method according to claim 8, which further comprises:

after transmitting the signal to said motor, transmitting a computer-readable message compliant with the device API to said smart hub over a device network, the computer-readable message indicating the adjustable bed is in the inclined position;

converting the computer-readable message compliant with the device API to a computer-readable message compliant with the server API with said smart hub;

transmitting the computer-readable message compliant with the server API from said smart hub to said server over the server network;

transmitting the computer-readable message compliant with the server API from said server to a further smart device; and indicating said adjustable bed is in the inclined position on said further smart device after receiving the computer-readable message compliant with the server API from the server.

11. A method for inclining an adjustable bed, which comprises:

prompting inclining of the adjustable bed by saying a voice command to incline the adjustable bed within hearing distance of a microphone in a smart hub;

sending the voice command from the microphone to a microprocessor in the smart hub;

generating, with said microprocessor, recorded sounds compliant with a server API from the voice commands received from the microphone;

transmitting the recorded sounds compliant with the server API from said smart hub to a server across a server network;

generating, with the server, a computer-readable instruction compliant with the server API from the recorded sound compliant with the server API received from the smart hub, said computer-readable instruction instructing the adjustable bed to move to an inclined position;

transmitting the computer-readable instruction compliant with the server API from said server to said smart hub across said server network;

converting, with said microprocessor of said smart hub, said computer-readable instruction compliant with the server API to a computer-readable instruction compliant with a device API;

transmitting said computer-readable instruction compliant with the device API from said smart hub to a controller across a device network;

generating, with said controller, a signal to activate a motor of the adjustable bed;

transmitting the signal from said controller to said motor; and activating said motor after receiving the signal from said controller until said adjustable bed reaches an inclined position.

12. A method for stopping snoring by inclining an adjustable bed, which comprises:

positioning a microphone of a smart hub within hearing distance of an adjustable bed;

recording a snoring sound with said microphone;

prompting inclining of the adjustable bed by transmitting the snoring sound recorded by the microphone to a microprocessor in the smart hub;

generating with said microprocessor, a server-compliant sound recording from the snoring sound received from the microphone, said server-compliant sound recording being compliant with a server API;

transmitting the server-compliant sound recording from said smart hub to a server across a server network;

detecting, with the server, snoring in the server-compliant sound recording;

generating, with the server, a computer-readable instruction compliant with the server API after detecting the snoring in the server-compliant sound recording, the computer-readable instruction instructing the adjustable bed to move to an inclined position;

transmitting the computer-readable instruction compliant with the server API from said server to said smart hub across said server network;

converting, with said microprocessor of said smart hub, said computer-readable instruction compliant with the server API to a computer-readable instruction compliant with a device API;

transmitting said computer-readable instruction compliant with the device API from said smart hub to a controller across a device network;

generating, with said controller, a signal to activate a motor of the adjustable bed;

transmitting the signal from said controller to said motor; and activating said motor after receiving the signal from said controller until said adjustable bed reaches an inclined position.

13. The method according to claim 12, which further comprises starting to generate the server-compliant sound recording only after detecting a spoken prompt in the snoring sound recorded by the microphone.

14. The method according to claim 12, which further comprises relating, in a database connected to said server, an identity of the adjustable bed to an identity of the smart hub to a time when said server detected snoring in the server-compliant sound recording.

15. A method for stopping snoring by inclining an adjustable bed, which comprises:

positioning a microphone of a smart hub within hearing distance of an adjustable bed;

detecting, with a microprocessor in said smart hub, snoring recorded by said microphone;

generating, with said microprocessor, a signal indicating said microprocessor detected snoring, said signal being compliant with a server API;

transmitting the signal from said smart hub to a server across a server network;

generating, with the server, a computer-readable instruction compliant with the server API, the computer-readable instruction instructing the adjustable bed to move to an inclined position;

transmitting the computer-readable instruction compliant with the server API from said server to said smart hub across said server network;

converting, with said microprocessor of said smart hub, said computer-readable instruction compliant with the server API to a computer-readable instruction compliant with a device API;

transmitting said computer-readable instruction compliant with the device API from said smart hub to a controller across a device network;

generating, with said controller, a signal to activate a motor of the adjustable bed;

transmitting the signal from said controller to said motor; and activating said motor after receiving the signal from said controller.

16. A smart adjustable bed system, comprising:

a smart adjustable bed, including:

a bedframe having a head frame piece and a foot frame piece, said head frame piece being movable relative to said foot frame piece to move said bedframe from a flat position to an inclined position;

a motor for inclining and declining said bedframe, said motor being connected to at least one of said head frame piece and said foot frame piece, and said motor moving said at least one of said head frame piece and said foot frame piece to move the bedframe from the flat position to the inclined position when activated;

a bus for carrying signals to said motor, said bus being connected to said motor;

a controller for converting computer-readable instructions to signals for controlling said motor, said controller being connected to said bus, said controller having a controller transceiver and a microprocessor connected to said controller transceiver, said controller transceiver being configured to receive a computer-readable instruction, the computer-readable instruction being an instruction to move said bedframe from the flat position to the inclined position, said controller transceiver being further configured to send the computer-readable instruction to said microprocessor, said microprocessor being programmed to generate a signal to activate said motor after processing the computer-readable instruction, said microprocessor sending said signal to said motor via said bus, said controller transceiver being configured to transmit a computer-readable message; and a smart hub, including:
- a device transceiver being configured to send the computer-readable instruction over a device network to said controller transceiver and to receive the computer-readable message over the device network from said controller transceiver;
- a server transceiver sending data over a server network to a server, said server transceiver receiving data over the server network from the server;
- a network gateway interconnecting said device transceiver and said server transceiver; said network gateway including a smart-hub microprocessor, said smart-hub microprocessor being programmed to convert a computer-readable message complying with a server API to a computer-readable message complying with a device API and to convert a computer-readable message complying with the device API to a computer-readable message complying with the server API; and
- a microphone being connected to said smart-hub microprocessor, said microphone being within listening range of said smart adjustable bed;
- said microphone being configured to send recorded sounds originating near the smart adjustable bed to said smart-hub microprocessor; and
- said smart-hub microprocessor analyzing the recorded sounds for snoring and transmitting a signal to incline said adjustable bed from said server transceiver to a server after detecting the snoring in the recorded sounds, the signal being compliant with the server API.

* * * * *